No. 737,634. PATENTED SEPT. 1, 1903.
K. KIEFER.
CLEARING AND PURIFYING CHAMPAGNE FERMENTED IN BOTTLES.
APPLICATION FILED APR. 1, 1901.
NO MODEL.
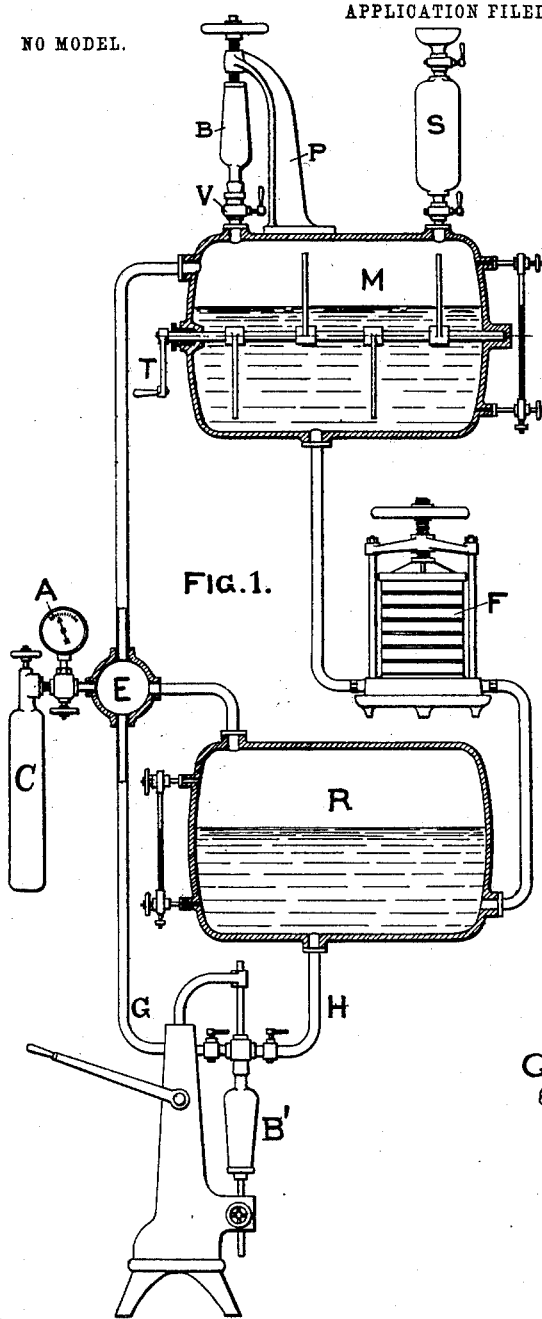
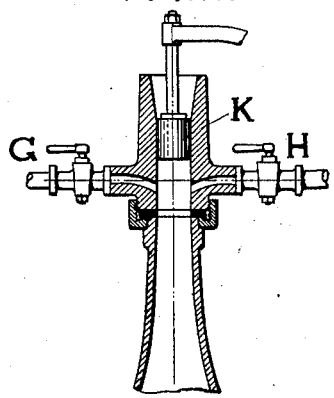

No. 737,634.

Patented September 1, 1903.

UNITED STATES PATENT OFFICE.

KARL KIEFER, OF CINCINNATI, OHIO.

CLEARING AND PURIFYING CHAMPAGNE FERMENTED IN BOTTLES.

SPECIFICATION forming part of Letters Patent No. 737,634, dated September 1, 1903.

Application filed April 1, 1901. Serial No. 53,787. (No specimens.)

*To all whom it may concern:*

Be it known that I, KARL KIEFER, a citizen of the United States, residing at Cincinnati, in the county of Hamilton and State of Ohio, have invented a new and useful Improvement in Clearing and Purifying Champagne Fermented in Bottles, of which the following is a specification.

I hereby declare that the following is a clear and exact description of the invention, which will enable others skilled in the art to which it appertains to use the same.

Champagne is an old drink consisting of wine which underwent a fermentation within a closed bottle in preferably cold rooms. The carbonic acid thus produced by this fermentation is retained within the wine and lends to the drink its effervescence and agreeable taste. However, such wine after terminating its fermentation within the bottle appears to be tart (dry) for the taste of the consumer. Therefore the bottle of champagne was opened, the sediment removed by a process which was called "disgorging," and sweetening, and sometimes flavoring, was added to the champagne to make it agreeable to the taste. This process of disgorging and sweetening caused a certain amount of carbonic acid to escape, which in my invention I will avoid by the arrangement and method described in the following: The wines for preparation of champagne must be young wines containing, preferably, some of the wine-yeast germs capable of starting a new fermentation when sugar or other sweetening matter has been added. The process most in vogue to-day is to press the young wine in the fall of the year and let it undergo its first fermentation during the winter in large casks. This wine is then drawn off from its yeast, mixed with sugar or other sweetening matter, and filled into strong walled bottles and hermetically closed. The retained germs of the wine soon start the second fermentation, and the quantity of the sweetening matter is so measured as to produce the necessary pressure within the bottles, so as not to cause any bursting of the bottles. It must be understood that this sweetening disappears entirely in the course of fermentation in the bottle, all sugar being transformed into alcohol and carbonic acid. After a certain lapse of time this fermentation is entirely terminated, which state is noticed by the depositing of all dead yeast-cells upon the walls of the bottles. The next process that champagne has to undergo is the clearing process.

Heretofore champagne fermented in bottles has been cleared by a very tedious and expensive manual process. The fermentation having terminated, the yeast sediment began to deposit on the sides of the bottles. Those bottles had to be shaken every day by hand and the inclination of the position had to be gradually increased until the bottle stood on its top and all sediment settled down upon the cork.

The following operation is called "disgorging." By that operation the cork was caused to suddenly escape from the bottle. The pressure which had accumulated through the fermentation within the bottle forced it out suddenly as soon as the fastener which kept it within the bottle had been cut or removed. All the dirt having settled upon the cork was naturally ejected simultaneously with the cork; but a certain amount of dirt having adhered closely to the walls of the bottle it was necessary to remove it with the finger of the hand, consequently allowing at the same time a certain amount of liquid to escape during this operation. This operation is naturally costly, as a good deal of the champagne had been lost. It is not very appetizing, as the finger of some individual had to clean the bottle. It also resulted in the loss of a good amount of the carbonic-acid gas which lends champagne the quality of effervescence and agreeable taste.

Clearing by filtration has been applied to champagne fermented in "bulk," that means champagne terminating its fermentation within comparatively large metal tanks having liquid and gas connections. Champagne of that kind, however, has never been a success, owing to the chemical and mechanical disparity between the champagne fermented in bottles, owing, also, to the costliness of the metal containers which were occupied by the champagne during the full length of its last fermentation.

After clearing the next operation the champagne had to undergo was the sweetening. Champagne to taste agreeable has to contain a certain amount of sweetening, which is supplied in the shape of a solution of rock-candy, sometimes flavored with a little cognac. This was added by hand or sometimes by so-called "dosing-machines." At any event the proportion of the addition of this sweetening to the amount of champagne retained in the bottle after disgorging varies greatly, preventing the uniformity of taste of champagne.

The object of my invention is to clear and sweeten champagne after its fermentation in bottles, avoid escape of the gas and loss of wine and the coming in contact of champagne with anything but clean machinery, simplify the operations of sweetening and clearing, and attain a greater uniformity than could have been attained by the hand process.

To carry my invention into effect, I transfer the contents of all bottles containing champagne under pressure to one common container or tank, add the sweetening in proper proportion, mix the whole mass thoroughly, and then filter into a second tank. From there I draw the champagne into bottles. The whole process I carry out under pressure equal to or greater than that pressure under which the champagne has terminated its fermentation while in the bottles.

In the accompanying drawings, Figure 1 illustrates a diagrammatic arrangement of the apparatus used to carry out my process. Fig. 2 shows a detail of the apparatus.

I will now describe in detail those minor processes which allow the transfer of the liquid under pressure from one tank to another one or from the tank to the bottles without losing any of the original carbonic-acid gas and under the exclusion of air.

In order to dump the contents of the bottles into a common tank, I proceed as follows: I freeze either the whole contents of the fermented champagne or that small part next to the cork by suitable means. In order to freeze the neck of the bottle only, I have to put the bottle upside down into a freezing liquid, such as brine. The neck will freeze under the extreme cold, while the upper part of the bottle is still liquid. In that condition I remove the cork or any other contrivance which has been used during the secondary fermentation of the liquid in the bottle. The contents of the bottle being frozen or closed by a prop of ice will stay within the bottle. I now transfer the bottle B to an opening connected to a tank M and closed temporarily by a valve V. The opening is preferably on top of the tank and has a rubber ring against which the frozen bottle, turned upside down, is placed. If I now open that valve, connection will be established between the bottle and the interior of the tank M. Tank M has previously been put under a pressure equal to or greater than that pressure which has previously obtained within the bottles during the secondary fermentation. In moderate temperature the bottles soon thaw out, and the contents of the bottle will drop into the mixing-tank M. Standing continually under a pressure (of tank M) the carbonic-acid gas contained within the fermented champagne will have no chance to escape. In other words, foaming is made impossible.

In order to remove the empty bottle from the tank, I close the valve V again, whereupon the bottle B can be taken off. The tank naturally may contain a number of such openings to be rapidly filled with the contents of the bottles. In the same manner in which I empty a bottle into the tank I now empty the contents of a large reservoir S, containing the sweetening, into the mixing-tank M, mix the whole mass of champagne and sweetening by T, and then proceed to the filtration. In order to filter the tank full of champagne, I have at a lower level another tank, as receiving-tank R. Interposed between both tanks is a filter F. Before I commence the filtration I produce in the receiving-tank R a pressure equal to that of the mixing-tank M. This pressure is supplied from a common source C, which may be liquid carbonic acid or any other supply of gas. It is kept at a constant pressure by a pressure-regulator A. It first goes into an expansion-tank E and from there connects with both tanks M and R. By opening the proper valves the cloudy liquid of the mixing-tank M will flow through the filter F into the receiving-tank R. The gas of receiving-tank R is displaced and driven through the communicating connections into the top of tank M. Foaming during the whole process of filtration is impossible, as the whole apparatus, filter, and tanks stand under a uniform pressure greater than that under which the champagne has terminated its fermentation within the bottle.

Regarding the filtering material employed, I will say that paper-pulp, cellulose, wood-pulp, asbestos-pulp, and similar fibrous pulp may be employed. The material should be packed closely enough to retain all dead yeast-cells, as well as all other mechanical impurities. Sterility of the filter material, as well as of the whole apparatus, is preferable to prevent further possibility of an after-fermentation.

Regarding the filter, I will say that any good pulp filter may be employed, preferably, however, the one patented to me on the 30th of March, 1897, No. 579,586.

After the receiving-tank R is full of clear champagne the same may be drawn off into the original bottles again after the same have been cleansed with pure water. The drawing off is accomplished with a filling and corking machine, such as has been on the market for a great length of time for filling charged liquids. This filling and corking machine has a contrivance to compress the cork K (shown in detail in Fig. 2) and a mouthpiece of elastic material W, against which the bottle can be pressed, and the two openings G and H, terminating below cork K. The openings G and H are controlled by stop-cocks. After the bottle has been filled the cork can be driven within the mouth of the bottle, preventing any escape of gas. In my process of filling bottles, however, I employ the precaution of filling the bottles first with carbonic-acid gas in order to insure the exclusion of any air from the champagne.

From Fig. 1 it is plainly evident that the filtered champagne of tank R flows into the bottle B' and displaces the gas through connection G without foaming, as the whole operation proceeds under a common pressure determined by a regulator A.

I do not want to limit myself as to the exact steps of the process as herein described. I deem the procedure, however, preferable as herein detailed.

Having described my invention, what I claim as new, and desire to secure by Letters Patent, is—

1. The process of disgorging champagne fermented in bottles, consisting of assembling it after the termination of the fermentation in a common mixing-tank, sweetening it and filtering it, all under a pressure equal to or greater than the fermentation of the champagne developed within the bottles, then drawing it off into the cleansed bottles.

2. The process of disgorging champagne fermented in bottles, consisting of assembling it after the termination of the fermentation in a common mixing-tank, sweetening it and filtering it, all under a pressure, then drawing it off into the cleansed bottles.

3. The process of disgorging champagne fermented in bottles, consisting of transferring the contents of all bottles holding fermented champagne to one common container, adding the sweetening, and mixing the whole mass thoroughly, filtering into a second tank, and drawing off the clear champagne into bottles, the whole operation proceeding under one common constant pressure, equal to or greater than the fermentation of the bottle created.

4. The process of disgorging champagne fermented in bottles, consisting of assembling it after the termination of the fermentation in a common mixing-tank, and filtering it, all under a pressure equal to or greater than the fermentation of the champagne developed within the bottles, then drawing it off into the cleansed bottles.

5. The process of disgorging champagne fermented in bottles, consisting of transferring the contents of the bottles to one common container, filtering it, and drawing off the clear champagne into bottles, the whole operation proceeding under pressure to prevent the escape of the original fermented gas.

6. The process of disgorging champagne fermented in bottles, consisting of transferring the contents of the bottles to one common container, and mixing the whole mass thoroughly, filtering into a second tank, and drawing off the clear champagne into bottles, the whole operation proceeding under one common constant pressure, equal to or greater than the fermentation of the bottle created.

7. The process of disgorging champagne fermented in bottles, consisting of assembling it after the termination of the fermentation in a tank system, sweetening and filtering it in bulk, and drawing it off again into bottles, materially retaining the original carbonic-acid gas, developed by fermentation.

8. The process of disgorging champagne fermented in bottles, consisting of assembling it after the termination of the fermentation in bulk in a tank system, filtering it in bulk, and drawing it off again into bottles, materially retaining the carbonic-acid gas, originally developed by fermentation.

9. The process of disgorging champagne fermented in bottles, consisting of transferring it after the termination of the fermentation into auxiliary vessels for the purpose of sweetening and filtering, or filtering only, then drawing it off into bottles again, materially retaining the carbonic-acid gas, originally developed by fermentation.

KARL KIEFER.

Witnesses:
A. RHEINSTROM,
C. L. RICHTER.